US008568024B2

(12) United States Patent
Zhou et al.

(10) Patent No.: US 8,568,024 B2
(45) Date of Patent: Oct. 29, 2013

(54) TEMPERATURE DETECTING SYSTEM

(75) Inventors: Hai-Qing Zhou, Shenzhen (CN);
Song-Lin Tong, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 779 days.

(21) Appl. No.: 12/774,742

(22) Filed: May 6, 2010

(65) Prior Publication Data

US 2011/0232893 A1 Sep. 29, 2011

(30) Foreign Application Priority Data

Mar. 29, 2010 (CN) .......................... 2010 1 0134629

(51) Int. Cl.
*G05D 23/00* (2006.01)
(52) U.S. Cl.
USPC ........................ 374/135; 374/100; 713/300
(58) Field of Classification Search
CPC ..................................................... G06F 1/206
USPC ........... 374/120, 135, 100, 184, 45, 109–111, 374/137, 170; 361/679.48, 695; 700/299–301; 713/300; 165/244–245; 110/300
See application file for complete search history.

(56) References Cited

U.S. PATENT DOCUMENTS

| 4,602,642 A * | 7/1986 | O'Hara et al. ................ 600/474 |
| 4,632,127 A * | 12/1986 | Sterzer ......................... 607/156 |
| 5,781,024 A * | 7/1998 | Blomberg et al. ........ 324/750.02 |
| 5,926,386 A * | 7/1999 | Ott et al. .......................... 700/70 |
| 6,275,779 B1 * | 8/2001 | Pohle et al. .................... 702/130 |
| 6,340,874 B1 * | 1/2002 | Vladimir ........................ 318/471 |
| 6,792,550 B2 * | 9/2004 | Osecky et al. ................ 713/300 |
| 6,810,202 B2 * | 10/2004 | Hsu et al. ....................... 388/800 |
| 7,256,562 B2 * | 8/2007 | Lee ................................. 318/268 |
| 7,310,737 B2 * | 12/2007 | Patel et al. ..................... 713/300 |
| 7,609,018 B2 * | 10/2009 | Lin et al. ....................... 318/471 |
| 7,619,380 B2 * | 11/2009 | Lo et al. ........................ 318/268 |
| 2002/0040280 A1 * | 4/2002 | Morgan ......................... 702/114 |
| 2005/0082053 A1 * | 4/2005 | Halabi .......................... 165/217 |
| 2007/0116553 A1 * | 5/2007 | Chen et al. ...................... 415/47 |
| 2009/0190625 A1 * | 7/2009 | Chung et al. .................... 374/11 |
| 2011/0226463 A1 * | 9/2011 | Cao ................................ 165/287 |
| 2011/0307187 A1 * | 12/2011 | Watari et al. .................... 702/32 |
| 2012/0046792 A1 * | 2/2012 | Secor ............................. 700/276 |

\* cited by examiner

*Primary Examiner* — Peter Macchiarolo
*Assistant Examiner* — Tania Courson
(74) *Attorney, Agent, or Firm* — Altis & Wispro Law Group, Inc.

(57) ABSTRACT

A temperature detecting apparatus for adjusting direction of airflow from a fan according to thermal status in an electronic device, includes a detection module, a control module, and a driver module. The detection module detects temperatures of a plurality of position coordinates in the electronic device and converts the detected temperatures and the plurality of position coordinates corresponding to the detected temperatures to first voltage signals. The control module receives the first voltage signals and compares the temperatures of corresponding position coordinates to output a position coordinate of the greatest temperature according to the first voltage signals. The driver module receives the position coordinate of the greatest temperature and directs airflow towards a position having the greatest temperature.

1 Claim, 3 Drawing Sheets

TEMPERATURE DETECTING SYSTEM

BACKGROUND

1. Technical Field

The present disclosure relates to temperature detecting systems, and particularly to a temperature detecting system for detecting temperature in an electronic device.

2. Description of Related Art

Developments in today's highly information-intensive society have led to remarkable improvements in the performance of electronic devices. During operation of many contemporary electronic devices such as computers, central processing units (CPUs) produce large amounts of heat. Typically, one or more fans are used to facilitate the removal of heat in a computer. However, each fan can only dissipate heat for a fixed heat source. A personal computer usually needs a plurality of fans to dissipate heat for a plurality of different heat sources, which increases the cost and has a low efficiency.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used herein, refers to logic embodied in hardware or firmware, or to a collection of software instructions, written in a programming language, such as, for example, Java, C, or Assembly. One or more software instructions in the modules may be embedded in firmware, such as an EPROM. It will be appreciated that modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
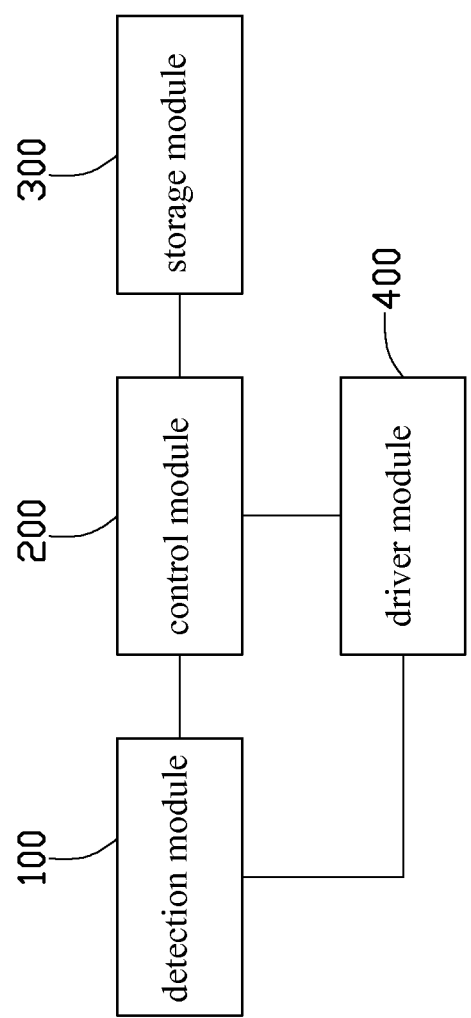
FIG. 1 is a block diagram of an embodiment of a temperature detecting system.

Referring to FIG. 1, a temperature detecting system of an exemplary embodiment for adjusting the heat dissipating angle of a fan (not shown) according to thermal status in a PC chassis (not shown), includes a detection module 100, a control module 200, a storage module 300, and a driver module 400. The detection module 100 detects the temperature in the PC chassis, and converts the detected temperature and a plurality of position coordinates corresponding to the detected temperatures to first voltage signals. The control module 200 receives the first voltage signals, and converts the first voltage signals to datum, which is stored in the storage module 300. The control module 200 compares the temperatures of corresponding position coordinates to output a position coordinate of the greatest temperature according to the first voltage signals. The driver module 400 receives the position coordinate of the greatest temperature, and operates the fan to rotate and turn toward a corresponding position and/or direct airflow from the fan via guides towards the corresponding position in the PC chassis. The driver module 400 also instructs the detection module 100 to detect the temperature in the PC chassis.

Figure 2:
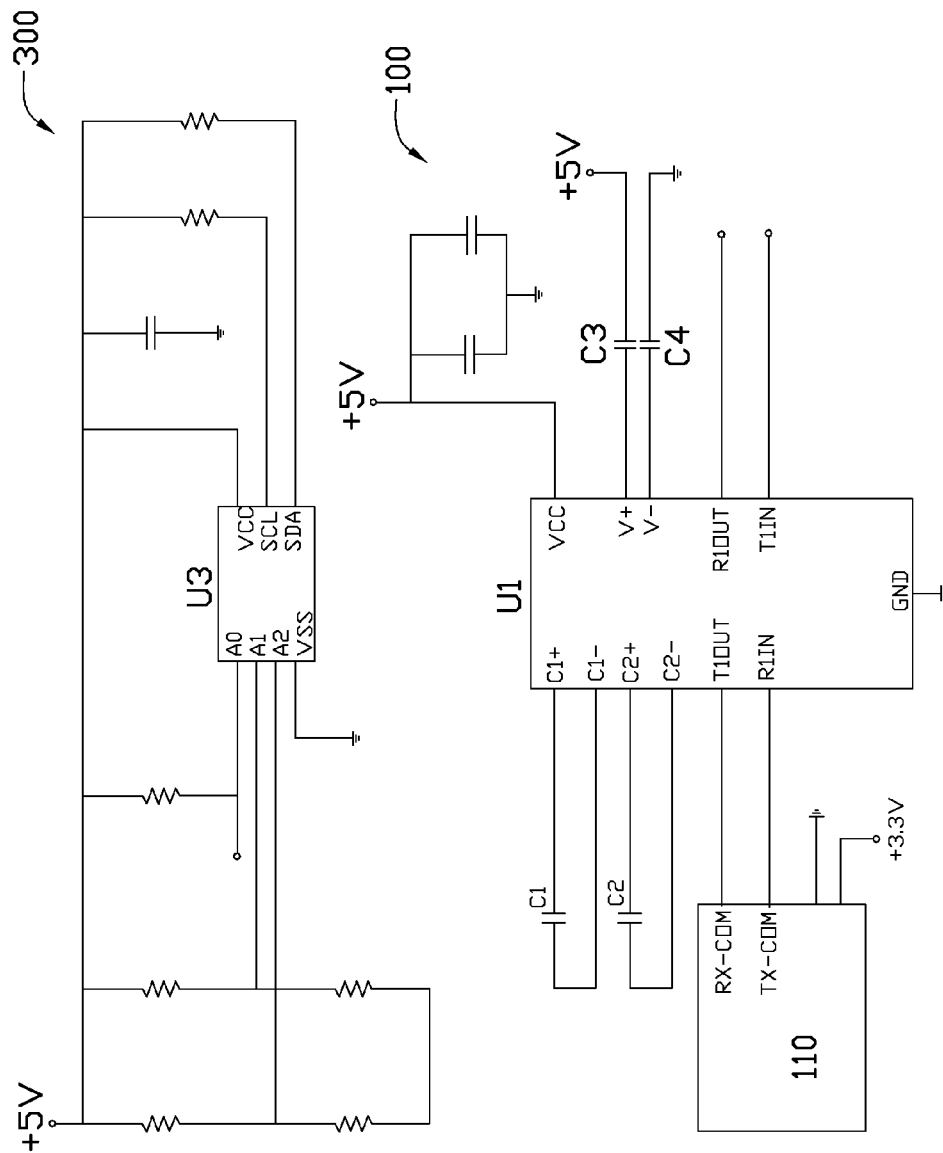
FIG. 2 is a circuit schematic of a detection module and a storage module of FIG. 1.
Figure 3:
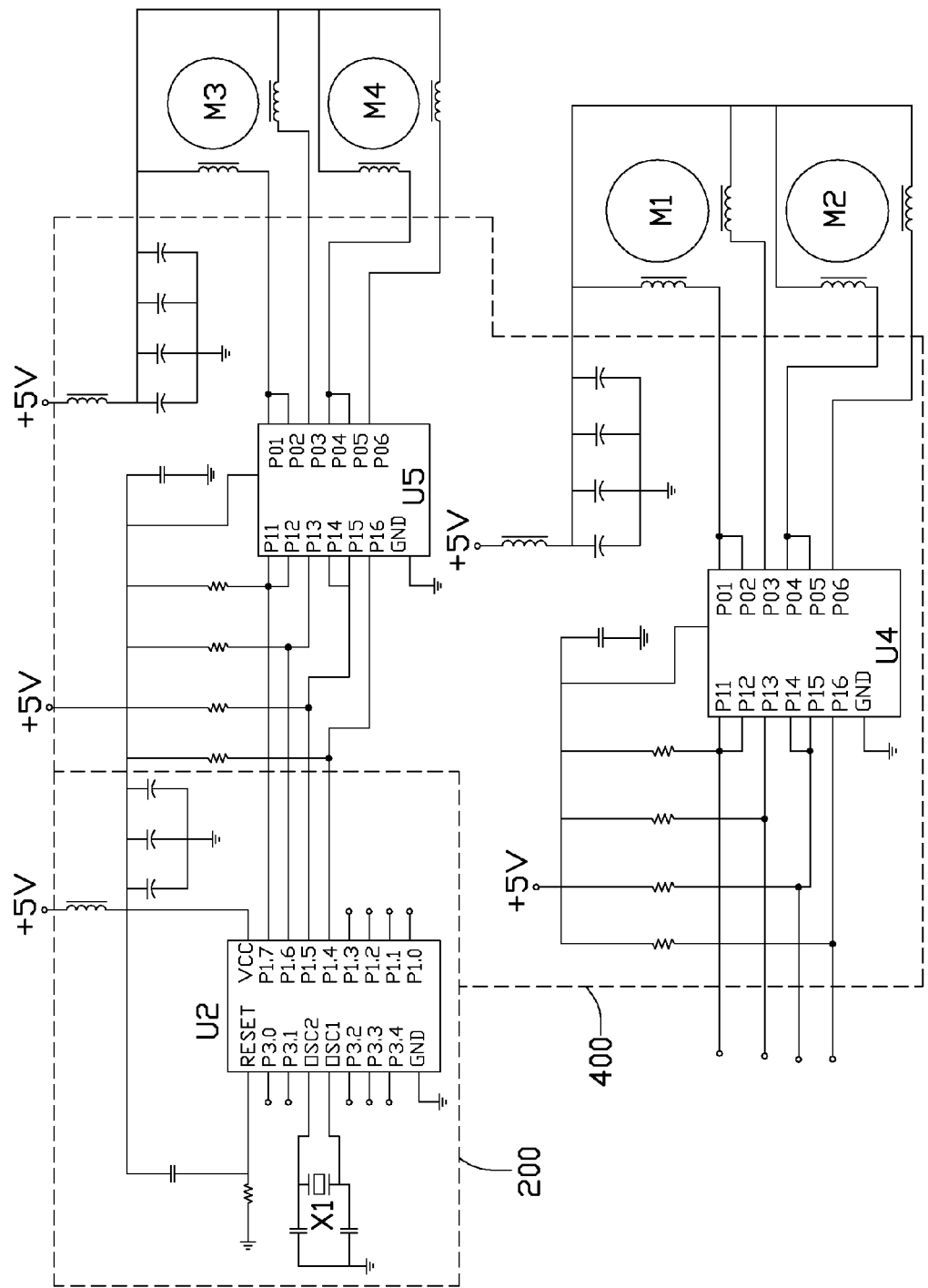
FIG. 3 is a circuit schematic of a control module and a driver module of FIG. 1.

Referring to FIGS. 2 and 3, the detection module 100 includes an infrared probe 110, a voltage level conversion chip U1, and capacitors C1~C4. The infrared probe 110 includes a digital signal transmission port TX-COM and a digital signal receiving port RX-COM. In one embodiment, the voltage level conversion chip U1 is a MAX232 type chip for RS-232 standard interface circuit of computer. The voltage level conversion chip U1 includes charge ports C1+, C1−, V+, V−, C2+, C2−, and data transforming ports T1 IN, T1 OUT, R1 IN, R1 OUT. The charge ports C1+, C2+ are electrically coupled to the charge ports C1− and C2− via the capacitors C1 and C2 respectively. The charge ports V+ and V− are electrically coupled to a +5 volt DC voltage and are grounded via the capacitors C3 and C4 respectively. The charge ports C1+, C1−, V+, V−, C2+, C2− and capacitors C1, C2, C3 and C4 form a charge pump circuit for generating a +12V voltage and a −12V voltage which are provided to the RS-232 standard interface circuit. The digital signal transmission port TX-COM transmits a second voltage signal to the data transforming port R1 IN. The voltage level conversion chip U1 converts voltage level of the second voltage signal, and outputs the first voltage signal at the data transforming port R1 OUT.

The control module 200 includes a micro controller chip U2 having eight bit bidirectional I/O ports P1.0~P1.7, P3.0~P3.4, an oscillator signal input port OSC1, and an oscillator signal output port OSC2. The I/O port P3.0 receives the first voltage signals from the data transforming port R1 OUT. The I/O port P3.1 outputs a first feedback signal when the receiving of the first voltage signals is completed. The data transforming port T1 IN receives the first feedback signal from the I/O port P3.1. The voltage level conversion chip U1 converts voltage level of the first feedback signal, and outputs a second a second feedback signal at the data transforming port T1 OUT. The digital signal receiving port RX-COM receives the second feedback signal from the data transforming port T1 OUT. The infrared probe 110 detects temperatures of other positions in the PC chassis when it receives the second feedback signal. The oscillator signal input ports OSC1 and OSC2 are grounded via a crystal oscillator X1 respectively. The I/O ports P3.2~P3.4 outputs serial clock signals, serial data signals, and address signals respectively. The serial data signals include voltage signals of the detected temperatures and position coordinates. The address signals include addresses for storing voltage signals of the detected temperatures and position coordinates. The I/O ports P1.0~P1.3 outputs detection control signals respectively. The I/O ports P1.4~P1.7 outputs rotation control signals respectively.

The storage module 300 includes an electrically erasable programmable read-only memory (EEPROM) U3. The EEPROM U3 has a serial clock port SCL, a serial data port SDA, and an address port A0 capable of receiving the serial clock signals, serial data signals, and address signals respectively from the I/O ports P3.2~P3.4. The driver module 400 includes driver chips U4 and U5 and motors M1~M4. Each of the driver chips U4 and U5 includes I/O ports P01~P06 and P11~P16. The driver chip U4 I/O ports P11~P16 receive the detection control signals from the I/O ports P1.0~P1.3 respectively. The driver chip U4 I/O ports P01~P06 output driver signals to operate the motors M1 and M2 to rotate according to the detection control signals. The motors M1 and M2 rotate to control the infrared probe 110 movement and detect temperatures of different positions in the PC chassis. In one embodiment, the motors M1 and M2 control the infrared probe 110 movements in vertical and horizontal directions respectively.

In use, the micro controller chip U2 outputs detection control signals to the driver chip U4. The driver chip U4 outputs driver signals to control the motors M1 and M2 to rotate. The infrared probe 110 moves and detects temperatures of different positions in the PC chassis. The infrared probe 110 transmits the detected temperatures and corresponding position coordinates to the micro controller chip U2 via the voltage level conversion chip U1. The micro controller chip U2 converts the temperatures and corresponding position coordinates to serial datum which is stored in the EEPROM U3. The micro controller chip U2 compares the temperatures of corresponding position coordinates to output a position coordinate of the greatest temperature. The driver chip U5 receives the position coordinates of the greatest temperature, and operates the motors M3 and M4 to rotate the fan toward a corresponding position in the PC chassis to dissipate the heat of the position coordinates of the greatest temperature. In one embodiment, the motors M3 and M4 control the fan to rotate in vertical and horizontal directions respectively.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A temperature detecting system for adjusting direction of airflow from a fan according to thermal status in an electronic device, comprising:

a detection module capable of detecting temperatures of a plurality of position coordinates in the electronic device and converting the detected temperatures and the plurality of position coordinates corresponding to the detected temperatures to first voltage signals; wherein the detection module comprises an infrared probe and a voltage level conversion unit; the infrared probe comprises a digital signal transmission terminal capable of outputting second voltage signals; the voltage level conversion unit comprises a first voltage level signal input terminal and a first voltage level signal output terminal; the digital signal transmission terminal is capable of transmitting the first voltage signals to the first voltage level signal input terminal; and the voltage level conversion unit is capable of converting voltage level of the second voltage signals and outputting the first voltage signals at the first voltage level signal output terminal;

a storage module;

a control module capable of receiving the first voltage signals and comparing the temperatures of corresponding position coordinates to output a position coordinate of the greatest temperature according to the first voltage signals; wherein the control module converts the first voltage signals to datum which are stored in the storage module; the control module comprises a micro controller; the micro controller comprises a voltage level signal receiving terminal and a plurality of first and second control signal output terminals; the voltage level signal receiving terminal is capable of receiving the first voltage signals; and the first and second control signal output terminals are capable of outputting detection control signals and rotation control signals respectively;

a driver module capable of receiving the position coordinate of the greatest temperature and directing airflow towards a position having the greatest temperature; wherein the driver module comprises a first driver module and a second driver module; the first driver module comprises a plurality of first control signal input terminals and a plurality of first driver signal output terminals; the second driver module comprises a plurality of second control signal input terminals and second driver signal output terminals; the first and a plurality of second control signal input terminals are capable of receiving the detection control signals and rotation control signals respectively; and the first and second driver signal output terminals are capable of outputting first and second driver signals respectively;

a probe motor capable of receiving the first driver signal and adjusting movement of the infrared probe to detect temperatures of different positions in the electronic device; and a fan motor capable of receiving the second driver signal and adjusting the fan rotating and turning toward a corresponding position in the electronic device.

* * * * *